Patented July 3, 1934

1,965,458

UNITED STATES PATENT OFFICE 1,965,458

PROCESS FOR THE MANUFACTURE OF AROMATIC HYDROXY ALDEHYDES

Franz Elger, Basel, Switzerland, assignor to Hoffmann-La Roche Inc., Nutley, N. J., a corporation of New Jersey No Drawing. Application February 23, 1933, Serial No. 658,245. In Germany May 18, 1932

2 Claims. (Cl. 260—137)

According to the process of application Serial No. 630,322 it is possible to oxidize phenols, which contain propenyl radicles in the ortho- or para-position to the hydroxyl group, in aqueous-alkaline solution to the corresponding aldehydes with the aid of nitro-aryl-sulphonic acids or nitro-aryl-carbonic acids.

It has now been found that phenols, which instead of the propenyl radicle contain the carbinol group, that is to say hydroxy-benzyl-alcohols, can also be oxidized in aqueous-alkaline solution with the same oxidizing agents. If the hydroxy-benzyl-alcohols are obtained in the usual manner by condensation of formaldehyde with phenols in alkaline solution, it is afterwards sufficient to boil the condensation product with the addition of for instance a sodium-m-nitro-benzene-sulphonate in order to obtain the hydroxy aldehydes. In this manner it is likewise possible to convert hydroxy-benzyl-alcohols, which contain 2 carbinol groups, for instance dimethylol-para-cresol, into the corresponding di-aldehydes.

Example 1

15 parts by weight of vanillyl-alcohol are dissolved in 120 parts by weight of a 10% solution of sodium hydroxide, 25 parts by weight of a sodium-m-nitro-benzene-sulphonate are added and boiled during 4 hours under a reflux condenser. The reaction product is then acidified with sulphuric acid and extracted with ether. With the aid of bisulphite solution the vanillin is extracted from the ether in very good yield.

The equation of the reaction occurring is as follows:

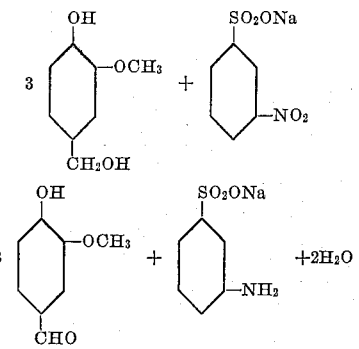

Example 2

45 parts by volume of a dilute nitro-benzene-sulphonation product (containing 34.2% of m-nitro-benzene-sulphonic acid) are neutralized with 48 parts by volume of a 20% solution of sodium hydroxide and further 48 parts by volume of a 20% solution of sodium hydroxide are added. While heating on the water-bath 13.6 parts by weight of 3-methoxy-4-hydroxy-phenyl-trichloro-methyl-carbinol are added and the reaction product is then boiled for 14 hours under a reflux condenser. From the acidified solution the oxidation products are extracted with ether and the vanillin thus obtained is separated from the 4-hydroxy-3-methoxy-benzoic acid by recrystallization from benzene.

The equation of the reaction occurring is as follows:

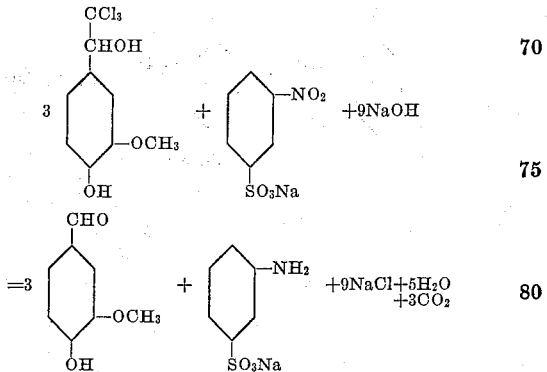

Example 3

9.4 parts by weight of phenol are dissolved in 150 parts by volume of a 3.3% solution of sodium hydroxide and 8.5 parts by weight of formaldehyde (40%) are added. After prolonged standing 10 parts by weight of caustic soda are dissolved in the solution, 12 parts by weight of a sodium-m-nitro-benzene-sulphonate are added and boiled for 1½ hours under a reflux condenser. The acidified reaction liquid is extracted with ether and from the ether the aldehydes are extracted with bisulphite solution. Unchanged phenol remains in the ether, whereas from the bisulphite solution besides some salicyl-aldehyde principally para-hydroxy-benzaldehyde is obtained.

The equation of the reaction occurring is as follows:

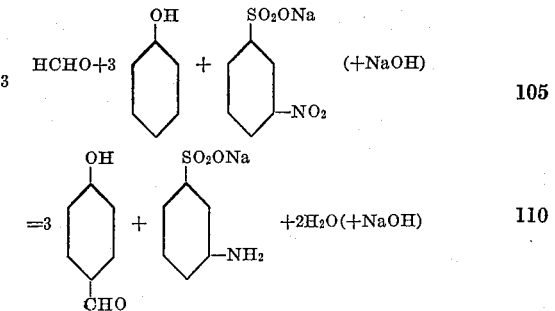

Example 4

4 parts by weight of 2,6 dimethylol-para-cresol are dissolved in 40 parts by weight of a 10% solution of sodium hydroxide, 10 parts by weight of sodium-m-nitro-benzene-sulphonate are added and heated on the steam-bath for 2 hours. The sodium salt of the 4-hydroxy-uvitic-aldehyde thus obtained is precipitated. It is separated by suction and on decomposition with acids yields pure 4-hydroxy-uvitic-aldehyde, possessing the structure

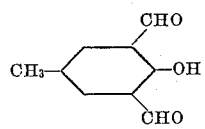

melting at 133° C.(Berichte der Deutschen Chemischen Gesellschaft, vol. 42/II, 1909, page 2545).

The equation of the reaction occurring is as follows:

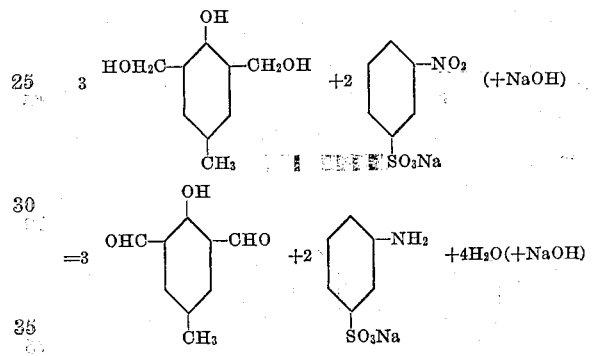

I claim:

1. A process for the manufacture of aromatic hydroxy aldehydes which consists in heating, in alkaline solution, a substituted phenol selected from the group which consists of a phenol with one carbinol group in each ortho position and a phenol with a carbinol group in the para position with an oxidizing compound selected from the group which consists of nitrobenzoic acids and nitrobenzene sulphonic acids.

2. A process for the manufacture of aromatic hydroxy aldehydes which consists in heating, in alkaline solution, a substituted phenol selected from the group which consists of a phenol with a carbinol group in the ortho position and a phenol with a carbinol group in the para position with an oxidizing compound selected from the group which consists of nitrobenzoic acids and nitrobenzene sulphonic acids.

FRANZ ELGER.